(12) United States Patent
Bartlett (10) Patent No.: US 6,797,171 B2
(45) Date of Patent: Sep. 28, 2004

(54) IN SITU ANAEROBIC BIOREMEDIATION OF EARTH AND SOLD WASTE CONTAMINANTS USING ORGANIC/WATER EMULSIONS

(76) Inventor: Robert W. Bartlett, 2505 Loch Way, El Dorado Hills, CA (US) 95762-5622

( * ) Notice: Subject to any disclaimer, the term of this patent is extended or adjusted under 35 U.S.C. 154(b) by 231 days.

(21) Appl. No.: 10/102,392

(22) Filed: Mar. 18, 2002

(65) Prior Publication Data

US 2002/0166813 A1 Nov. 14, 2002

Related U.S. Application Data

(60) Provisional application No. 60/290,718, filed on May 14, 2001.

(51) Int. Cl.$^7$ .................................................. C02F 3/00
(52) U.S. Cl. ...................... 210/610; 210/611; 210/616
(58) Field of Search ................................ 210/610, 611, 210/615, 616

(56) References Cited

U.S. PATENT DOCUMENTS

| | | | |
|---|---|---|---|
| 4,519,912 A | 5/1985 | Kauffman et al. | 210/611 |
| 4,522,723 A | 6/1985 | Kauffman | 210/611 |
| 4,732,681 A | 3/1988 | Galun et al. | 210/611 |
| 4,789,478 A | 12/1988 | Revis et al. | 210/611 |
| 4,857,203 A | 8/1989 | Pope et al. | 210/681 |
| 4,861,482 A | 8/1989 | Frankenberger, Jr. et al. | 210/611 |

(List continued on next page.)

OTHER PUBLICATIONS

Barnes, L. J., F. J. Janssen, P. J. H. Scheeren, J. H. Versteegh and R. O. Koch 1992. "Simultaneous microbial removal of sulphate and heavy metals from waste water. *Transactions of the Institution of Mining and Metallurgy 101:C 183–C 189.* itnev Catalog" Business Edition Catalog No. 630 B pp. 79–81.

Dvorak, D. H., H. M. Edenborn, R. S. Hedin, and P. E. McIntire. 1991. Treatment of metal–contaminated water using bacterial sulfate reduction: results from pilot–scale reactors. *Proceedings of the 1991 SME Annual Meeting* (Denver, CO, Feb. 25–28).

(List continued on next page.)

*Primary Examiner*—Chester T. Barry (57) ABSTRACT

A process for in situ anaerobic bioremediation of contaminated earth media and solid waste media, including mining and chemical plant wastes, is shown. The process includes creating an emulsion of organic liquid dispersed in water, followed by infiltrating the emulsion into the media. Water, as the continuous emulsion phase, provides low viscosity and media wetting, favorable to infiltration. The emulsion disengages inside the media leaving dispersed organic nutrient attached to the media where it is accessible for microbial redox reactions, causing anaerobic conditions. Bioremediation includes sulfate reduction and precipitation of metal sulfides, and many other contaminant altering reactions achievable under anaerobic conditions. Components of the organic liquid are selected to enhance microbial activity and media adhesion. Contaminated groundwater and surface water, such as acid mine drainage, can be treated as they flow through a saturated media bed after the emulsion has been introduced into the media.

59 Claims, 6 Drawing Sheets

U.S. PATENT DOCUMENTS

| | | | | |
|---|---|---|---|---|
| 4,990,031 | A | 2/1991 | Blowes et al. | 405/263 |
| 5,076,927 | A | 12/1991 | Hunter | 210/603 |
| 5,155,042 | A | 10/1992 | Lupton et al. | 435/262.5 |
| 5,178,762 | A | 1/1993 | Pokora et al. | 210/632 |
| 5,362,394 | A | 11/1994 | Blowes et al. | 210/617 |
| 5,511,907 | A | 4/1996 | Tabasco | 405/128 |
| 5,514,279 | A | 5/1996 | Blowes et al. | 210/617 |
| 5,554,290 | A | 9/1996 | Suthersan | 210/610 |
| 5,587,079 | A | 12/1996 | Rowley et al. | 210/603 |
| 5,632,715 | A | 5/1997 | Harrington et al. | 588/256 |
| 5,649,894 | A | 7/1997 | White et al. | 588/256 |
| 5,660,730 | A | 8/1997 | Lucchese et al. | 210/631 |
| 5,710,361 | A | 1/1998 | Harrington et al. | 588/256 |
| 5,738,789 | A | 4/1998 | Shugina | 210/610 |
| 5,833,855 | A | 11/1998 | Saunders | 210/611 |
| 5,898,093 | A | 4/1999 | Vos | 588/236 |
| 5,919,367 | A | 7/1999 | Khudenko | 210/605 |
| 6,080,572 | A | 6/2000 | Hard et al. | 435/262.5 |
| 6,143,177 | A | 11/2000 | Suthersan | 210/610 |
| 6,196,765 | B1 | 3/2001 | Harrington | 405/128.45 |
| 6,197,196 | B1 | 3/2001 | Rose et al. | 210/603 |
| 6,228,263 | B1 | 5/2001 | Rose et al. | 210/602 |
| 6,652,752 | B2 * | 11/2003 | Ward et al. | 210/610 |
| 2002/0022041 | A1 * | 2/2002 | Pavis et al. | 424/401 |

OTHER PUBLICATIONS

Gazea, G., Adam, K. and Kontopoulos, A. 1996. A review of passive systems for the treatment of acid mine drainage. *Minerals Engineering, 9, No.1*, pp. 23–42.

Hammack, R. W., D. H. Dvorak, and H. M. Edenborn. 1993. "The use of biogenic hydrogen sulfide to selectively recover copper and zinc from severely contaminated mine drainage", In *Biohydrometallurgical Technologies, I. Bioleaching Processes*. ed. by Torma, Wey and Lakshmanan., pp 631–640. TMS, Warrendale, PA. "*Herrington*", The Enthusiasts Catalog, p. 1, Memorial Day '00.

Maree, J. P., A. Gerber, and W. F. Strydom 1987 "Biological sulphate removal for industrial effluent in an upflow packed bed reactor". *Water Research 21* 141–146.

Noel, D. M., Fuerstenau, M. C. and Hendrix, J. M. 1991. "Degradation of Cyanide using Facultative Anaerobic Bacteria". In *Mineral Bioprocessing*., ed by Smith and Misra, pp 355–366 TMS, Warrendale, PA.

Sheeren, P. J., H. R. O. Koch, C. J. N. Buisman, L, H, Barnes, and H, G, Versteegh. 1992. New biological treatment plant for heavy–metal contaminated groundwater. *Transactions of the Institution of Mining and Metallurgy* 101–C 190–C 199.

Tuttle, J. H., P. R. Dugan, and C. I. Randles. 1969. "Mirobial sufate reduction and its potential utility as and acid mine water pollution abatement procedure". *Applied Microbiology* 17(2):297–302.

* cited by examiner

IN SITU ANAEROBIC BIOREMEDIATION OF EARTH AND SOLD WASTE CONTAMINANTS USING ORGANIC/WATER EMULSIONS

RELATED APPLICATIONS

The present application claims the benefit of U.S. Provisional Application No. 60/290,718, filed May 14, 2001, entitled "In Situ Anaerobic Bioremediation of Earth Environmental Contaminants Using Asphalt/water Emulsions," which is hereby incorporated by reference in its entirety.

BACKGROUND OF THE INVENTION

1. The Field of the Invention

The present invention relates to a process of bioremediation for contaminated earth and solid waste, herein referred to as permeable "media". More specifically, the present invention relates to a process of applying an emulsion containing an electron donor material to contaminated media to facilitate long-term anaerobic conditions for reducing harmful contaminants in the media to less harmful or insoluble material.

2. The Relevant Technology

Many industries, including mines, fossil fuel power plants, pulp and paper mills, chemical processing plants, oil refineries and phosphate fertilizer manufacturers create byproducts or waste that may contain environmentally harmful materials. These byproducts and waste materials are typically stored in waste sites that take the form of land fills, tailings piles, dumping grounds, spent ore heaps, sludge ponds, and the like. They can contaminate their surrounding environment adversely affecting the adjacent earth, surface water, subsurface ground water, and other media with which the contaminated media comes into contact. Additionally, meteoric water can cause certain contaminants to leach out of the contaminated media. Acid rock drainage is an example of a contaminated leachate.

Metal sulfates and sulfuric acid are constituents of acid rock drainage from tailings piles and the like. When in the earth, pyrite, other minerals and selenium are not susceptible to oxygen and aerobic conditions which may transform the solid sulfides, selenium, or other compounds into more dangerous soluble sulfates, selenates, and the like. However, once mined and brought to the surface, tailings piles and waste from mining and processing facilities etc., become susceptible to oxygen by exposure to air or rain. This creates the aerobic conditions which allow sulfide, selenium and other insoluble materials to transform into soluble sulfates and selenates. These soluble materials can leach out of the media in which they reside and may pose a problem to groundwater or the surrounding environment. This is especially true given the large quantities of waste rock and tailings in many mining operations.

Bioremediation is increasingly being used to destroy contaminants such as hazardous organic compounds, cyanide, and other potentially harmful byproducts of industrial processes. Many bioremediation processes require that contaminated water be pumped from the ground and treated by passage through bioreactor tanks. The problem with these processes is that the removal step is costly, requiring extra equipment and space for treatment facilities.

In situ bioremediation has been used to overcome some of the higher costs of offsite treatment. In situ bioremediation involves enhancing the activity of an indigenous bacteria consortium in order to accelerate a decontamination process at the site being treated. The enhancement is often accomplished by optimizing the availability of needed nutrients. This allows the bacteria consortium to facilitate conditions in which contaminants are transformed chemically or biochemically and rendered harmless in place, without requiring costly pumping, or other means of removal, or further processing of effluents above ground.

Bacteria derive their energy from oxidation-reduction reactions. In the absence of oxygen, anaerobic respiration can occur if other molecular species are present to provide oxygen or accept electrons. Soluble ferric, nitrate, carbonate, and sulfate ions have been used to provide oxygen or accept electrons.

The electron donor nutrient or material often used for in situ anaerobic bioremediation may be a form of organic carbon. Two common material forms of organic carbon are known in the art: (1) solid or semi-solid biomass and (2) soluble aqueous solutions which may include carbohydrates, organic acids, and/or organic salts. Both of these, however, suffer drawbacks. Solid biomass is difficult to introduce and disseminate within the media being treated. Aqueous solutions containing soluble materials are easily introduced by gravity infiltration or injection wells, but are leached out leaving no permanent protection against the reintroduction of oxygen into the media.

With respect to solid sources of carbon, U.S. Pat. No. 4,990,031 (Blowes et al.) teaches the treatment of mine tailings with a layer of biomass placed in the tailings impoundment below the elevation of the final saturated water level in it. Biomass (e.g. wood chips) can also be introduced with the tailings slurry stream entering the impoundment. U.S. Pat. Nos. 5,362,394 and 5,514,279 also by Blowes et al. teach the use of a reactive wall of porous material containing disseminated biomass to intercept and treat groundwater from a tailings impoundment. U.S. Pat. Nos. 4,519,912 and 4,522,723 (Kauffman et al.) treat wastewater, including mine wastewater, flowing through a treatment zone (reactive wall) consisting of a porous matrix containing nutrient and sulfate reducing bacteria.

However, direct injection of the bioremediation materials as slurries will result in the suspended solids occluding interstices of the media preventing, or at least making difficult, further flow. This is impractical, and commercial application would be costly and difficult. Furthermore, solid organic materials, such as those used in prior art applications, tend to seal the media interstices. Because of pore plugging, they cannot be used for surface infiltration into contaminated media. With the possible exception of colloids, solids are also unsuitable for treating groundwater plumes.

Solid sources of carbon, sewage, wood chips, and biomass have been used to treat sulfate waste water. U.S. Pat. No. 5,738,789 (Shugina) teaches metal immobilization in groundwater plumes using an injection of sulfate reducing bacteria cultures derived from natural materials such as organic containing clay, sawdust, and vegetable remnants, which are solid or semi-solid materials. However, solids are not suitable for in situ treatment of media such as ground, soil, tailings in piles, mine waste, etc. because it is difficult, if not impossible to disseminate solids into the media.

Some attempts to overcome the solid bioremediation source material problem include providing water soluble sources of carbon in aqueous solutions. For example, U.S. Pat. No. 5,833,855 (Saunders) teaches bioremediation of groundwater using sulfate reducing bacteria and a soluble source of carbon nutrient, preferably sodium lactate. U.S.

Pat. Nos. 5,554,920 and 6,143,177 (Suthersan) precipitate heavy metals with sulfate reducing bacteria, using wells to inject carbohydrate solutions (and sulfate if needed) into a saturated zone of the media. Metal immobilization by sulfate reducing bacteria using a liquid base containing an appropriate nutrient supplement is taught by U.S. Pat. No. 5,632,715 (Harrington et al.). This patent mentions water soluble carbohydrates including molasses, hydrolyzed potato starch, and milk whey. U.S. Pat. No. 5,710,361 (Harrington et al.) extends the claims from industrial wastes to earth materials.

Although carbohydrate nutrient solutions work well for metal immobilization and destruction of already dissolved contaminants, these nutrients are readily leached out of the media by continued flow of recycled solutions, groundwater and infiltrating meteoric surface water. Accordingly, soluble bioremediation material is not available to provide an effective long term solution. Moreover, soluble carbohydrates are relatively expensive.

Thus, it would be an advancement in the art to provide a more permanent environmental protection process using a bioremediation material that can easily enter the permeable contaminated media without clogging the media. It would be a further advancement to provide such a process that would provide long term retention and bioremediating conditions in the media. It would be yet another advancement to provide such a process using low cost bioremediation material. Such a bioremediation process is described and claimed herein.

BRIEF SUMMARY OF THE INVENTION

The process of the present invention has been developed in response to the present state of the art, and in particular, in response to the problems and needs in the art that have not yet been fully solved by currently available bioremediation processes. Thus, it is an overall objective of the present invention to provide a bioremediation process which facilitates decontamination by creating anaerobic conditions in a contaminated media using a permanent source of electron donor material to create lasting anaerobic conditions within the contaminated media. It is another objective of the present invention to provide a way to disseminate the electron donor material within the media without clogging the interstices within the media.

The bioremediation process of the present invention is in situ, or "at the site" of the contaminated media. The contaminated media may include soil, earth, surface mining waste, underground mining wastes, mill tailings, spent ore heaps, industrial waste, sludge ponds, landfills, and the like. The process includes creating an emulsion of a water insoluble organic liquid phase and an aqueous liquid phase. The organic phase should be capable of donating an electron in a chemical or biochemical reaction. In one embodiment, the organic phase may be oil, derived from mineral or vegetable sources. In another embodiment, the organic phase may be a petroleum product or blend of petroleum products such as residual fuel oil and asphalt.

The organic phase may be present in the emulsion in an amount between about one-tenth of one percent (0.1%) and about eighty percent (80%) of the volume of the emulsion. In another embodiment, the emulsion may contain biological nutrients such as phosphate, nitrogen, and/or water soluble organic materials including carbohydrates. The emulsion provides a vehicle for insertion of the organic phase or material into the media without clogging it. The continuous or external phase of the emulsion is water or an aqueous solution that provides the desired surface tension and capillary action for the emulsion to infiltrate the media, wet its internal surfaces and penetrate its smaller pores. This leaves the nonwetting organic phase as droplets, well disseminated within the media, after emulsion breakage.

Microorganisms may be present in the media or added to the media with the aqueous phase of the emulsion. The microbes may be in sufficient proximity to the organic material to promote a reaction between the organic material and the media contaminant. In one embodiment, the microbe facilitates the reduction of sulfate contaminants to soluble $H_2S$ or sulfide under anaerobic conditions. The microbes help precipitate metal contaminants such as As, Sb, Cd, Hg, Cu, Ni, Zn, Co, Mn, Ag, and Fe as metal sulfides. They may also help to alter the chemical composition of water soluble inorganic contaminants such as $CN^-$, $NO_3^-$, $NO_2^-$, $SeO_4^{2-}$, $Cr^{6+}$, or $UO_2^{2+}$ to create less harmful contaminants.

The organic/water emulsion may be applied to the media by distributing it on the surface of the media and allowing it to infiltrate or percolate into the media. In another embodiment, the emulsion may be inserted in the media by flowing into an injection well or other passage within the media. The emulsion may also be inserted into the media to form a reactive wall to intercept and treat a contaminant in water flowing through the media.

Once within the media, the emulsion may disengage (break) leaving the organic material retained as dispersed droplets within the media and adhering to internal media surfaces. Hence, it will not leach out, or be transported out, of the contaminated media by rain or other surface water. Thus, the organic electron donor material will be available to sustain anaerobic conditions within the contaminated media over a very long time to facilitate the chemical or biochemical reduction of harmful, soluble, contaminants to non-hazardous or insoluble forms.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the steps of the present invention, as generally described and illustrated in the figures herein, could be arranged and designed in a wide variety of different ways. Thus, the following more detailed description of the embodiments of the process, system, and method of the present invention as represented in FIGS. 1 through 6, is not intended to limit the scope of the invention, as claimed, but is merely representative of presently preferred embodiments of the invention.

Figure 1:
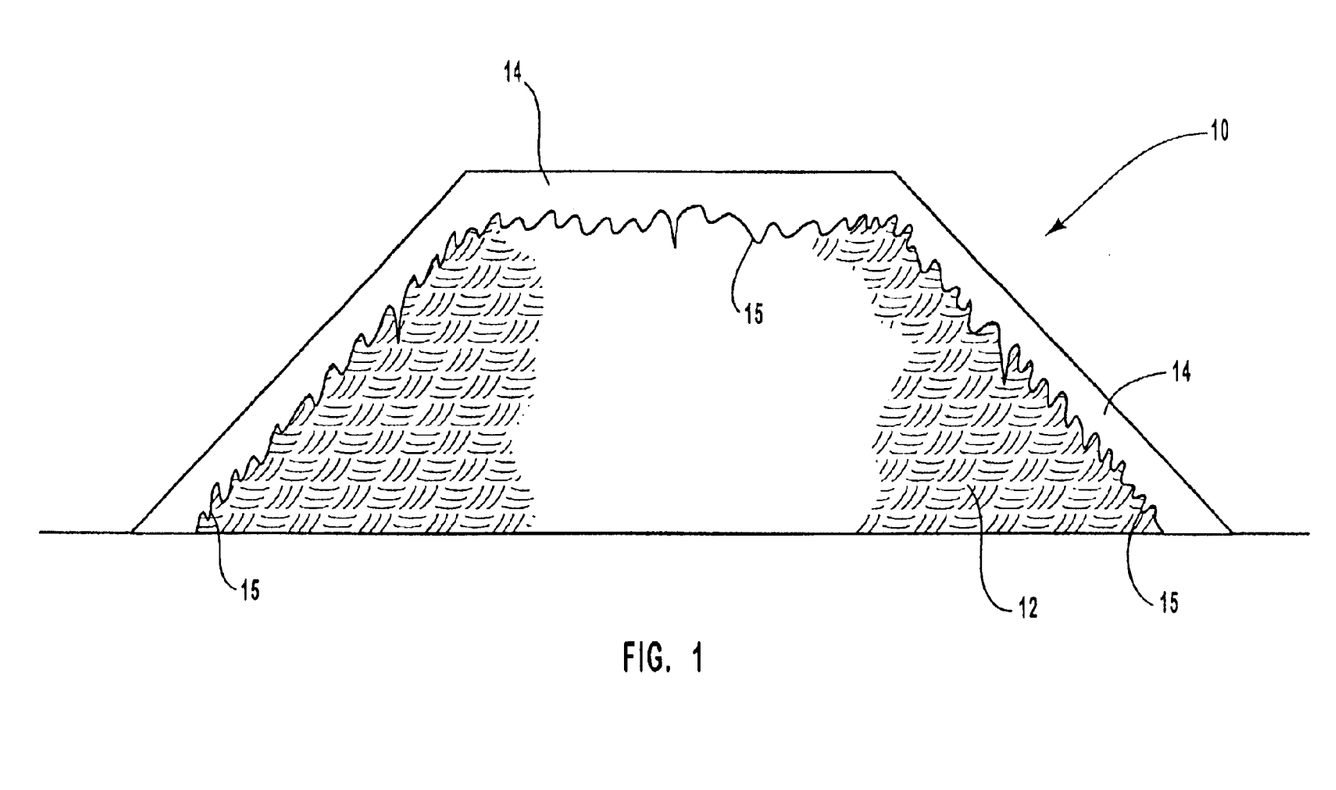
FIG. 1 is a side plan cutaway view of a contaminated media heap with a bioremediation emulsion applied to a surface of the media.

Referring to FIG. 1, the invention relates to an in situ environmental bioremediation process, generally designated at 10, for permeable earth and permeable solid industrial waste, both herein referred to as the media 12. The media 12 may be contaminated with hazardous water soluble species, including but not limited to heavy metals, sulfates, nitrates, arsenates, selenates, other oxy-anionic species, cyanide, and chlorinated hydrocarbon contaminants. The process 10 accomplishes its bioremediation results by destructive biochemical reduction of oxidized species such as sulfate and selenate.

It also immobilizes heavy metals such as Pb, Hg, Cd, Fe, Cu, Cr, Ni, Zn, Co, Mn, and Ag, through concurrent precipitation as sulfides. The process 10 converts the toxic metals into harmless solids that are confined to the media 12. It also prevents oxidation and dissolution of metals from minerals and precipitated compounds by permanently maintaining an excess of organic material adhering to the interstitial surfaces within the media 12.

These results are accomplished by infiltrating an emulsion 14, comprising a water-insoluble organic liquid phase dispersed in an aqueous liquid phase, into the media 12. With the assistance of microorganisms that exist in the media 12, or that are applied to the media 12 with the emulsion 14, organic material in the emulsion 14 donates electrons in biochemical reactions that deplete oxygen within the media 12; thus creating anaerobic conditions within a penetration depth 15 in the media 12. The depth of penetration 15 is an operating variable.

Accordingly, the present invention provides long term environmental protection using an organic/aqueous emulsion that can enter the permeable media 12 as a liquid wetting the media 12 interstitial surfaces, but gradually altering its state to leave the organic phase well disseminated as fine particles or liquid globules adhering to the media 12 surfaces so that it cannot be leached out of the media 12. A retained organic nutrient will also provide sustained anaerobic conditions and environmental protection as a reactive barrier to oxygen entering the media 12, either by gaseous diffusion and advection, or by oxygen dissolved in infiltrating meteoric water.

For many applications of this invention, the concentration of the organic material dispersed in the media 12 after emulsion breakage will not exceed one volume percent (1%) of the media 12, which is sufficient to give more than one thousand years of anaerobic protection against infiltrating rain water, saturated with dissolved oxygen at 8 parts per million. At these low concentrations, the organic liquid should be well below its saturation pressure and immobile. It will be appreciated by those of skill in the art that the organic material in liquid or insoluble forms can be designed with components that increase viscosity and promote adhesion to the media. Increased viscosity and adhesion favor retention of the organic material in the media 12.

Subsequent to emulsion 14 infiltration, with sufficient depth of penetration 15, any water entering the media 12 from its surface will be stripped of oxygen. For example, using the most common type of hydrocarbon, an alkane, oxygen may be depleted from the media 12 according to the following formula:

$$(3n+1)O_2 + 2C_nH_{2n+2} \rightarrow 2nCO_2 + (2n+2)H_2O$$

Similar reactions may be written for other hydrocarbon molecules. As a result, any sulfate selenate or other soluble molecules capable of accepting an electron can be reduced to sulfides, selenium, and the like. For example, sulfate reduction by an alkane is given by the following formula:

$$(3n+1)SO_4^{2-} + 4C_nH_{2n+2} \rightarrow 4nCO_2 + (4n+4)H_2O + (3n+1)S^{2-}$$

Another advantage of sulfate reduction in the media 12 is that heavy metals can react to form sulfide precipitates immobilized within the media 12. The reaction:

$$M^{2+} + S^{2-} \rightarrow MS$$

reverses the oxidation process that likely dissolved the metal contaminants under natural conditions.

The heavy metal sulfides are less soluble than the hydroxide and carbonate precipitates resulting from neutralization of acid rock drainage, so immobilization of heavy metals is very complete with this process chemistry.

It will be appreciated by those of skill in the art that in addition to metal immobilization as sulfides, the organic/water emulsions 14 of the present invention can by anaerobic processes render harmless other contaminants in permeable media, including but not limited to denitrification, cyanide destruction, chromium reduction and precipitation, reduction of chlorinated hydrocarbons and reduction-immobilization of oxyanion species including arsenates and selenates.

Figure 2:
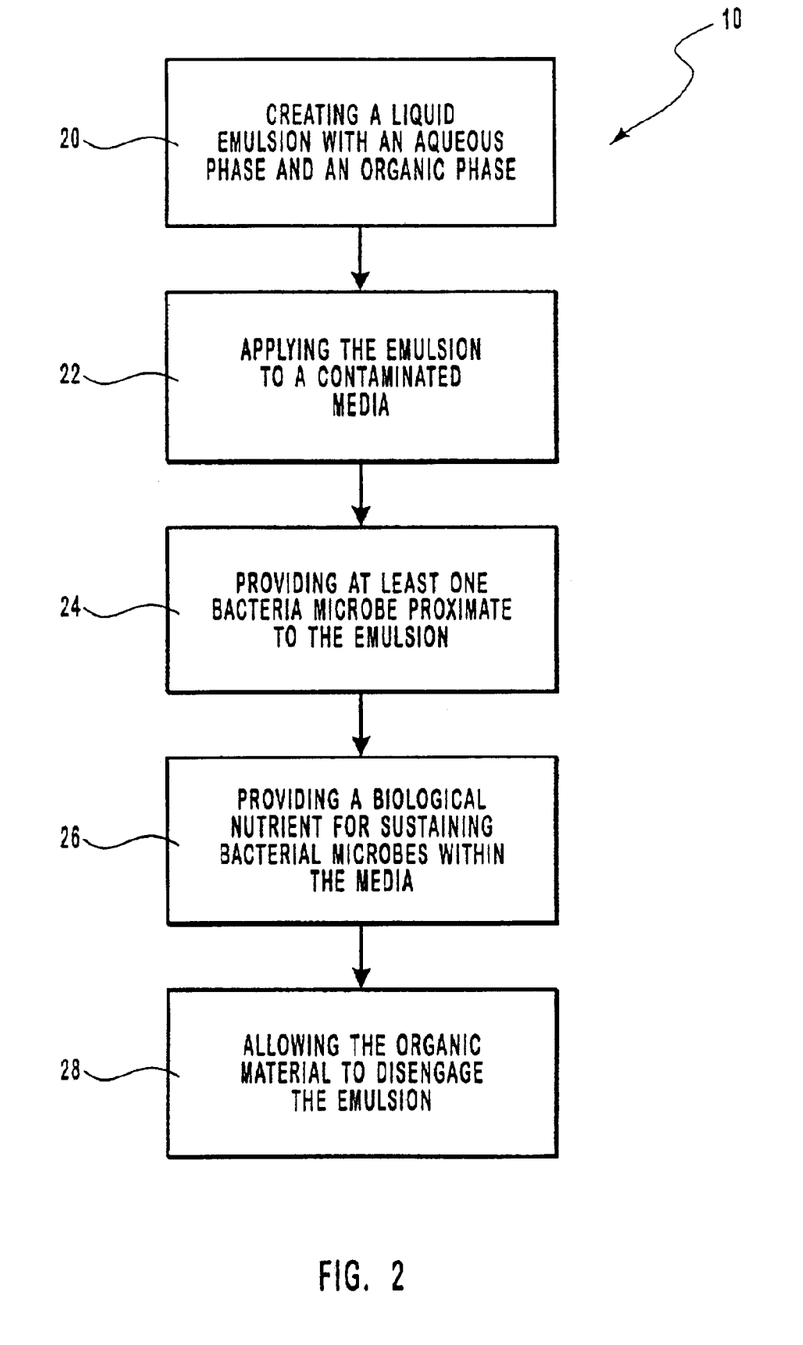
FIG. 2 is a block diagram of a bioremediation process.

Referring now to FIG. 2, the process 10 of the present invention is illustrated in a block diagram. The process 10 includes the step 20 of creating an emulsion 14 having a continuous aqueous phase and a discontinuous organic phase. The organic material may be capable of donating an electron in a chemical or biochemical oxidation reduction or "redox" reaction.

In one embodiment, the organic material in the emulsion may be oil derived from mineral sources or vegetable sources. In another embodiment the organic material may include a petroleum refinery product or blend of products such as residual fuel oil, asphalt and the like. Where asphalt comprises some of the organic material, an asphalt dissolving agent may be desirable. Asphalt dissolving agents, including naptha, kerosene, diesel fuel, fuel oil, oil gas, petroleum distillates, and the like, may be used to practice the teachings of this invention. The asphalt content of the organic material may be less than about fifty percent (50%). The solvent content of the organic material may be more than 20 percent (20%). It will be appreciated by those skill in the art that the selection of asphalt and the amount of asphalt in the organic material 14 may be chosen to promote adhesion of organic material 14 in a dispersed form to internal surfaces of the media 12. Further, the selection of the solvent and the amount of solvent in the organic material 14 may be chosen to provide a more reactive electron donor needed to enhance the rate of a biochemical redox reaction between the organic material 14 and a media 12 contaminant. Petroleum refinery products provide a low cost, readily available source of electron donor material. Additionally, much of the hydrogen in petroleum refinery products is not balanced with oxygen, as is the case with carbohydrates, and therefore, hydrogen in these oils is also an electron donor. It will be appreciated by those of skill in the art that organic/water emulsions 14 can be used as a substitute for, or in combination with carbohydrate aqueous solutions or other water soluble organic materials for bioremediation applications. Further, the aqueous phase of the emulsion, may include carbohydrates and other water soluble organic electron donor materials.

In one embodiment, the organic material may be present in the emulsion 14 in an amount greater than about one tenth of one percent (0.1%) by volume of the emulsion 14. The organic material may be present in the emulsion 14 in an amount less than about eighty percent (80%) by volume of the emulsion 14.

In one embodiment, the organic material is oil, which in the emulsion 14, makes up the discontinuous phase, dispersed as fine droplets in the continuous aqueous phase. With suitable agitation to make the droplets very small, the emulsion 14 may be stable.

Emulsion stability depends on the proper selection and dosage of an emulsifier agent. It will be appreciated that in the present invention it is important that the emulsion 14 be stable enough to transport the oil or other organic material into the media 12. It must also be unstable enough so that the emulsion will slowly disengage once inside the media 12 leaving organic droplets adhering to internal surfaces of media 12. The media 12 surface chemistry properties and the dilution of the emulsion 14 (for example by adding much more water just before insertion in the media 12) also greatly effect emulsion stability.

The emulsion 14 of the present invention may be synthesized with an emulsifying agent (surfactant) in a high shear mixer or homogenizer, for example, a colloid mill (discussed below). Emulsifying agents (emulsifiers) may be used to stabilize the emulsion 14 as it is produced. These agents include both ionic and nonionic surfactants that adsorb at the interface and lower the interfacial energy between the organic phase and water.

Quartz and other silicate rocks have anionic surfaces (negative zeta potential). Consequently, cationic emulsifiers promote binding of the organic constituent to the most common rocks. Conversely, anionic emulsifiers will tend to keep an emulsion 14 stable and allow it to flow through the rock interstices before breaking. Electrolytes in the water (or residual pore water in the media) may affect emulsion 14 stability. Counter-ions, especially high valence counter-ions will tend to break down an ionic emulsion 14. Hence, the pore water chemistry in the media 12 being treated must be considered in emulsifier selection and dosage.

The presence of asphalt in the organic phase will increase viscosity and strongly promote adhesion to the media, but the amount of asphalt need not be nearly as much as required in asphalt cements used to make road paving materials where cementing strength is a critical factor. Use of other adhesion promoters in the organic phase of the emulsion 14 is within the scope and teachings of this invention.

Asphalt is a complex mixture of large molecules including asphaltenes that are somewhat resistant to biochemical reactions. Simpler hydrocarbon molecules, such as are present in petroleum distillates may be desirable components of the organic phase because they are more reactive. These solvents usually can be fully mineralized to $CO_2$ and $H_2O$. Hence, one embodiment is an organic/water emulsion 14 in which the organic phase consists of a limited, but necessary amount of asphalt dissolved in high boiling petroleum refinery fractions, such as gas oil. This provides both reactive electron donor hydrocarbons and good organic adhesion to the media. High boiling fractions may be favored over lighter distillates because of their lower volatility, water solubility and cost.

The above-described organic liquid based on petroleum refinery products is a light non-aqueous phase liquid (LNAPL) that will necessarily contain small quantities of complex hydrocarbons that may be environmentally deleterious if not contained within the media. Low concentration, dispersion as discrete particles, viscosity and adhesion favor containment in the media. For bioremediation of contaminated earth, the amount of organic phase in the emulsion 14 may be substantially lowered after manufacture by diluting it with additional water. Dilution may depend on the contaminant concentration of the media 12 being treated. However, the content of organic phase in the emulsion 14 is not to be limited within the scope of this invention.

The emulsion 14 may be applied to the media 12 to establish anaerobic conditions within the media 12 as shown in step 22. The emulsion 14 may be applied to the media 12 by spreading or other distribution on a surface of the media 12. The emulsion 14 may then infiltrate or percolate into the media 12 by gravity. The emulsion 14 may also be applied to the media 12 by inserting the emulsion 14, or allowing it to flow by gravity, into a passage 18 (see FIGS. 4 and 5) positioned within the media 12. Infiltration of an organic/water emulsion 14 into the media 12 can also occur by any of the established methods used in agricultural irrigation and ore heap leaching for spreading water on surfaces. Among these are flooded basins, rotating impact sprinklers and pressure drip emitters for distributing the solutions.

Organic/water emulsions 14 can also be blended with a host media 12, whether contaminated or not, by mechanical mixing methods, including cement mixers, rotating drums, and methods used in producing road paving mixtures from liquid asphalt and aggregates. A flooded basin containing media 12 into which an organic/water emulsion 14 has been previously blended will be anaerobic and can be used to intercept and bioremediate acid rock drainage, or other contaminated aqueous streams, using sulfate reducing bacteria to immobilize the metal contaminants as sulfide precipitates.

Metering an organic/water emulsion 14 into tailings slurries, for example either within the conveying pipe or at the pipe discharge, can also be useful in providing anaerobic conditions in the tailings deposit. Similarly, emulsions 14 can be proportioned into waste rock or other aggregate while being carried on a conveyor belt or at the discharge of a conveyor belt.

The process 10 of the present invention also includes the step 24 of providing at least one bacteria microbe in sufficient proximity to the emulsion 14 of organic material or to the electron donor material to cause a reaction between the bacteria microbe and the organic material or electron donor material of the emulsion 14, which in turn promotes a reaction between the emulsion 14 and the contaminant in the media 12. For example, in one embodiment, the microbe facilitates the alteration of the chemical composition of at least one chlorinated hydrocarbon contaminant in the media 12 to a less environmentally harmful composition. The microbes relied upon may occur naturally within the media 12 or they may be added to the media 12 separately. In one embodiment, the microbe is included in the emulsion 14.

The bacteria microbe may facilitate the alteration of a chemical composition of at least one chlorinated hydrocarbon contaminant in the media 12 to a less environmentally harmful composition. It will be appreciated by those of skill in the art that reducing the solubility of a contaminant makes it less environmentally harmful because it is less likely to move into the surrounding environment. Microbes may act as a catalyst to alter the chemical composition of a water soluble inorganic contaminant in the media 12 into a less environmentally harmful composition. For example, the microbes may facilitate the change in alteration and chemical composition of $CN^-$, $NO_3^-$, $NO_2^-$, $SeO_4^{2-}$, $Cr^{6+}$, or $UO_2^{2+}$. A consortium of suitable microorganisms is usually present in earth being treated, but suitable bacteria cultures can be introduced into the media 12 when necessary. For example, in one embodiment, microbes from the genera Desulfovibrio, Desulfomonas and Desulfomaculum will provide sulfate reducing capability.

The emulsion 14, may include a biological nutrient 26, which helps sustain the bacterial microbes within the media. These nutrients may include phosphate, nitrogen, or carbohydrates, in various compounds. It may be present in the media 12 or may be added by a separate process. The determination of these nutrient requirements can readily be made by those skilled in microbiology.

When needed, other nutrients such as ammonium phosphate can be included in the water phase of the emulsion 14, and acid or alkali can be included to adjust the in situ pH. If there is a sulfate deficiency relative to the heavy metals to be immobilized sulfates, such as ammonium sulfate can be included with the emulsion 14.

The step 28 of allowing electron donor material in the form of the organic phase of the emulsion 14 to gradually disengage from the emulsion and leave organic phase particles or globules adhering to the internal surfaces of the media 12, providing permanent anaerobic protection. The anaerobic conditions not only facilitate the reduction of sulfates and facilitates metal immobilization as sulfides, but organic/water emulsions 14 can also render harmless other contaminants in permeable media 12, including, but not limited to, dentrification, cyanide destruction, chromium reduction and precipitation, reduction of chlorinated hydrocarbons and reduction-immobilization of oxyanion species including arsenates and selenates. Accordingly, the present invention provides a process for long term bioremediation by introducing electron donor material that is insoluble, yet easy to be inserted into the media 12. It will be appreciated that soluble electron donor material such as carbohydrates may also be applied to the media 12 in an emulsion 14 form to practice the teachings of this invention.

Figure 3:
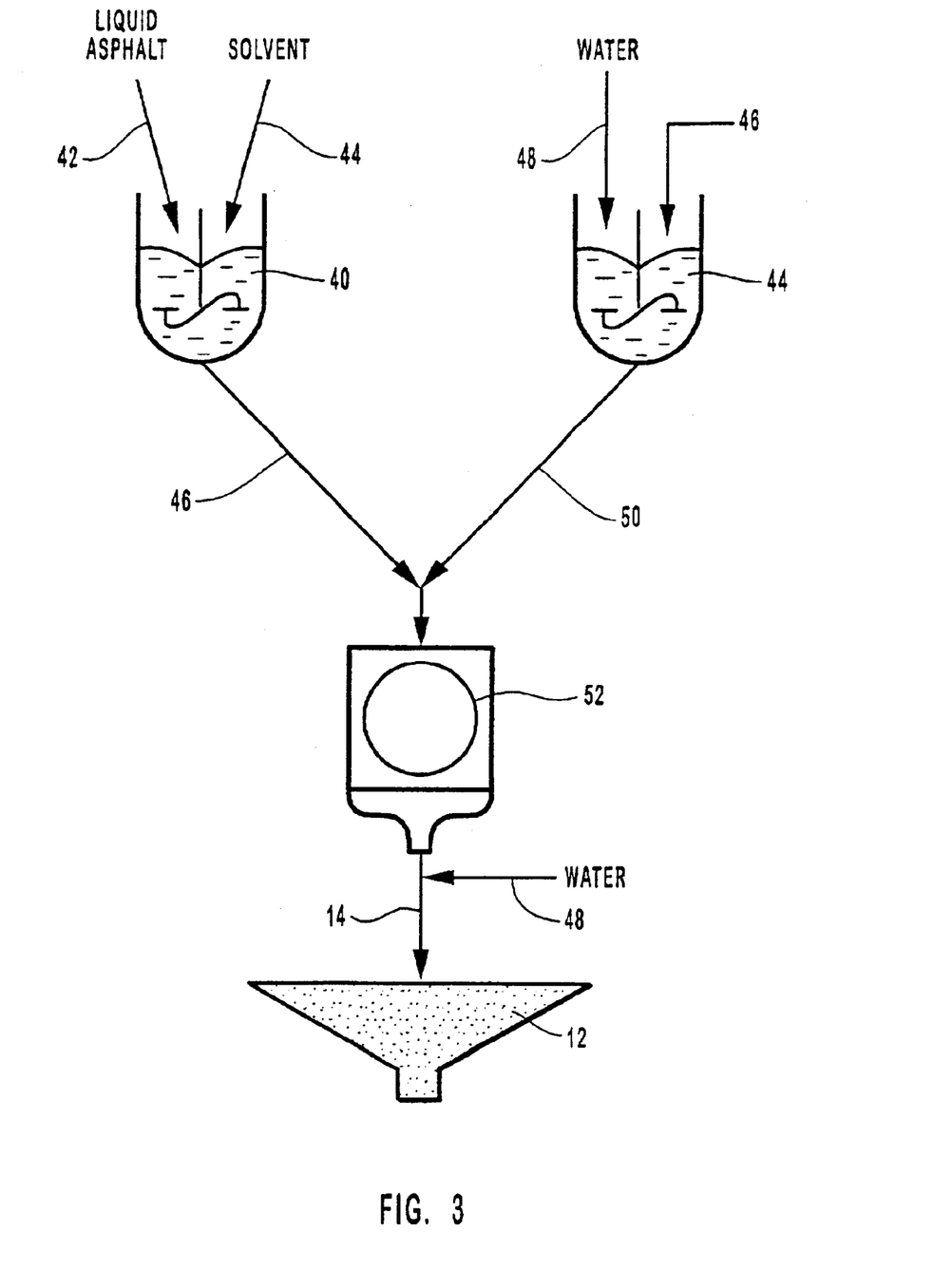
FIG. 3 is a block diagram of one embodiment of process steps to manufacture an organic/water emulsion using petroleum refinery products for an organic phase of the emulsion.

Referring to FIG. 3, one embodiment of steps for manufacturing an organic/water emulsion 14 and applying it to the media 12 is illustrated in block diagram. In step 40, a slow curing liquid asphalt 42, which is a commercial mixture of petroleum refinery asphalt, typically vacuum distillation residua, and diluting petroleum refinery solvents, mostly oil gas, is optionally blended with additional petroleum refinery solvent 44 to produce the organic liquid 46 utilized in making the emulsion 14. This organic liquid 46 may contain from about one percent (1%) to about fifty percent (50%) asphalt and from about fifty percent (50%) to about ninety-nine percent (99%) diluting solvent, including the solvent present in the commercial liquid asphalt 42.

In step 44 an emulsifying reagent 46 is dissolved with water 48. The resulting aqueous solution 50 is proportionately pumped continuously with the organic liquid 46 into a colloid mill 52 to produce the organic/water emulsion 14. Other high shear mechanical devices known in the art for producing emulsions 14 are within the scope of this invention. In one embodiment, the emulsifying reagent will be between about two percent (2%) and about five percent (5%) of the volume of the emulsion 14. Typically the organic phase in the emulsion 14 will comprise between about fifty percent (50%) and about seventy percent (70%) of the volume of the emulsion 14 as it leaves the colloid mill 52.

Optionally, the emulsion 14 may be further diluted with water 48, after it leaves the colloid mill 52 and before being applied to the media 12. Depending on the application, the water dilution may be very extensive before the emulsion 14 is applied to the media 12.

Figure 4:
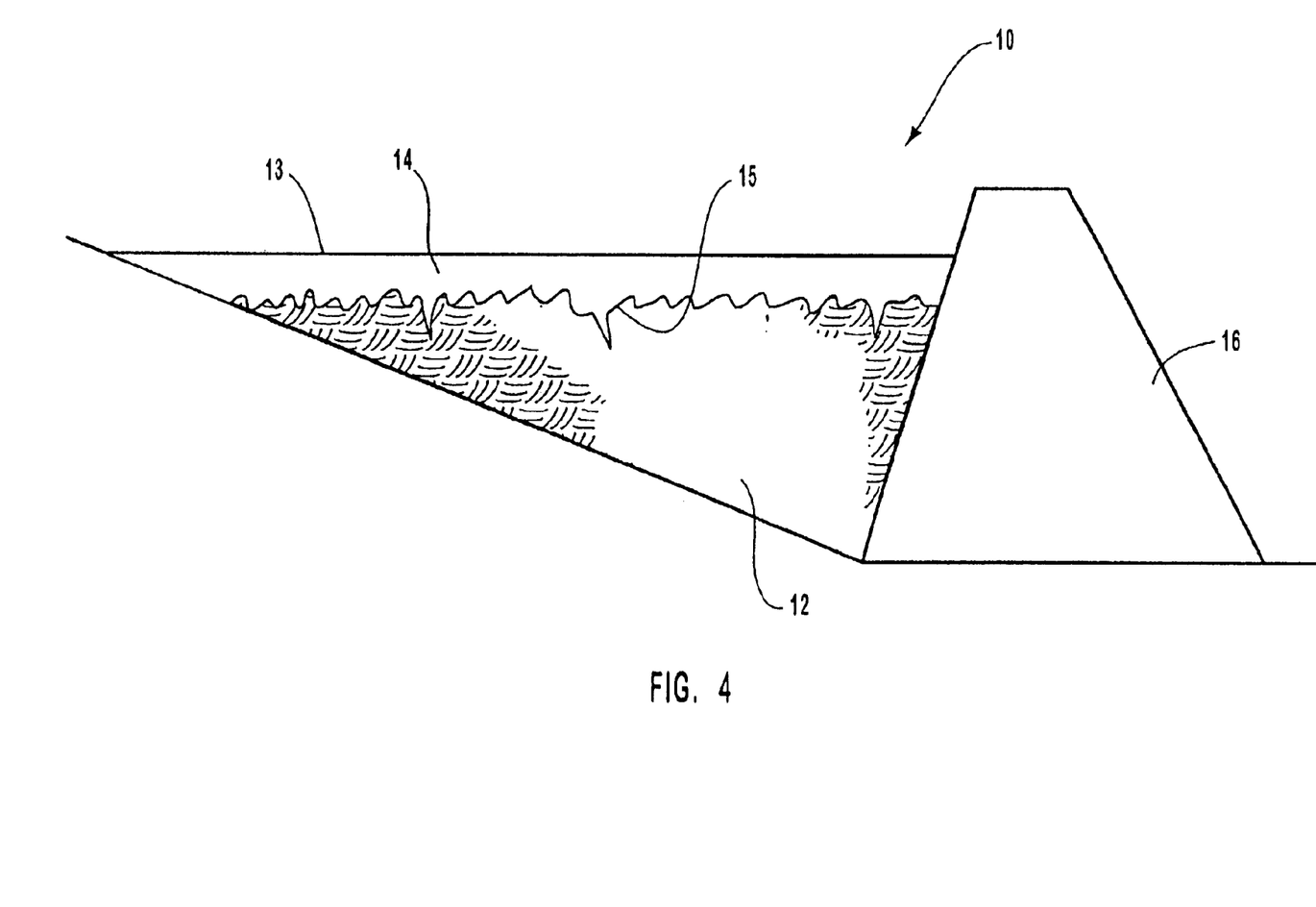
FIG. 4 is a side plan cutaway view of a different configuration of contaminated media impounded by a dam with bioremediation emulsion applied to a surface of the media.

FIG. 4 shows treatment of a solid waste impoundment behind a dam 16. An organic/water emulsion 14 is introduced to a surface 13 of the impounded media 12, and penetrates the near-surface zone to a depth 15. The bioremediation process 10 can include those chemical and biochemical reactions previously described with FIG. 1. The impounded media 12 may be saturated or unsaturated with water and it may include soil, earth, surface mining waste rock, underground mining waste rock, spent or chemically leached ore heaps, other mine waste, industrial waste stacks, landfills and mill tailings. Impounded media 12 in one embodiment may be used as a passive anaerobic wetland to intercept and treat contaminated surface water, with emulsion 14 inserted into the media 12 before or after the media 12 is submerged within a basic. In one embodiment, the contaminated surface water is acid rock drainage.

Figure 5:
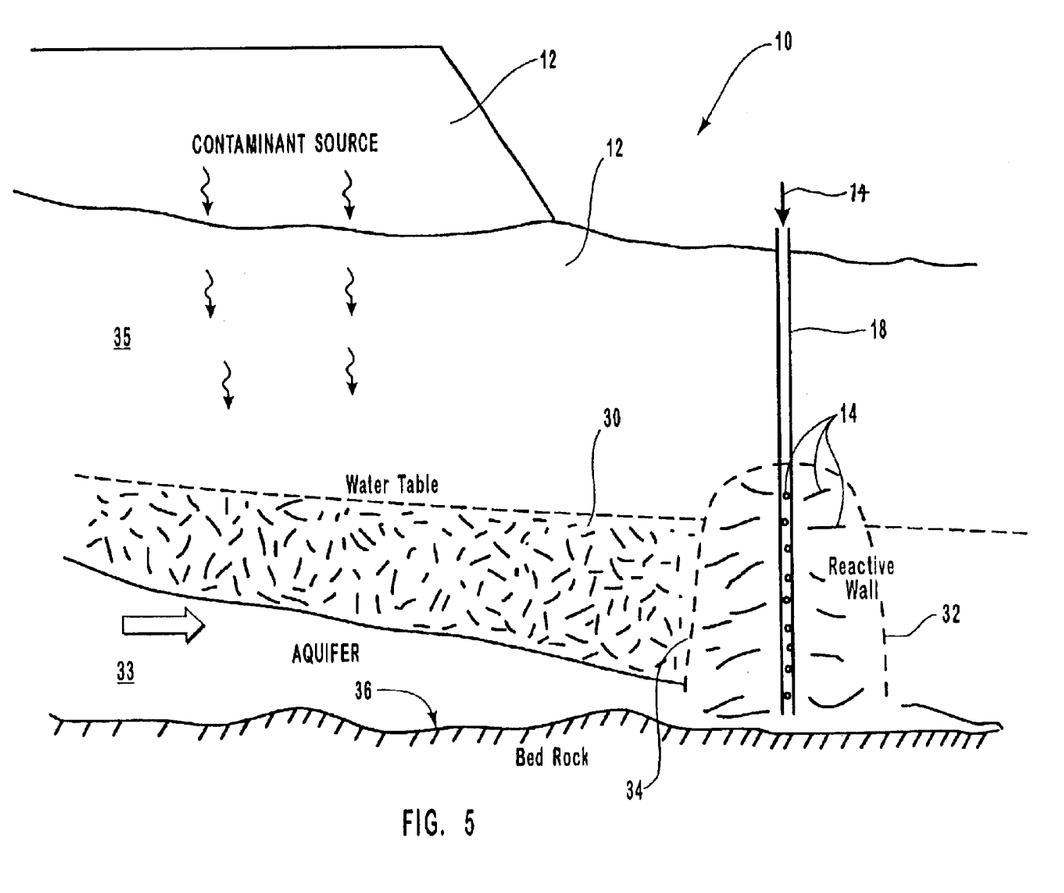
FIG. 5 is side plan cutaway view of contaminant source resting on an earth media with an underlying aquifer.

FIG. 5 illustrates subsurface injection of an organic/water emulsion 14 from wells or other passages 18 to form a biochemically reactive barrier or wall 32 in the aquifer 33. The reactive barrier 32 is comprised of subsurface media 12 containing organic material injected with the emulsion 14. Contaminant from media 12 infiltrates through a vadose zone 35 into the aquifer 33 creating a groundwater contaminant plume 30. As the groundwater plume 30 moves down-gradient it is intercepted by the edge 34 of the reactive wall 32 and is bioremediated by process 10.

Figure 6:
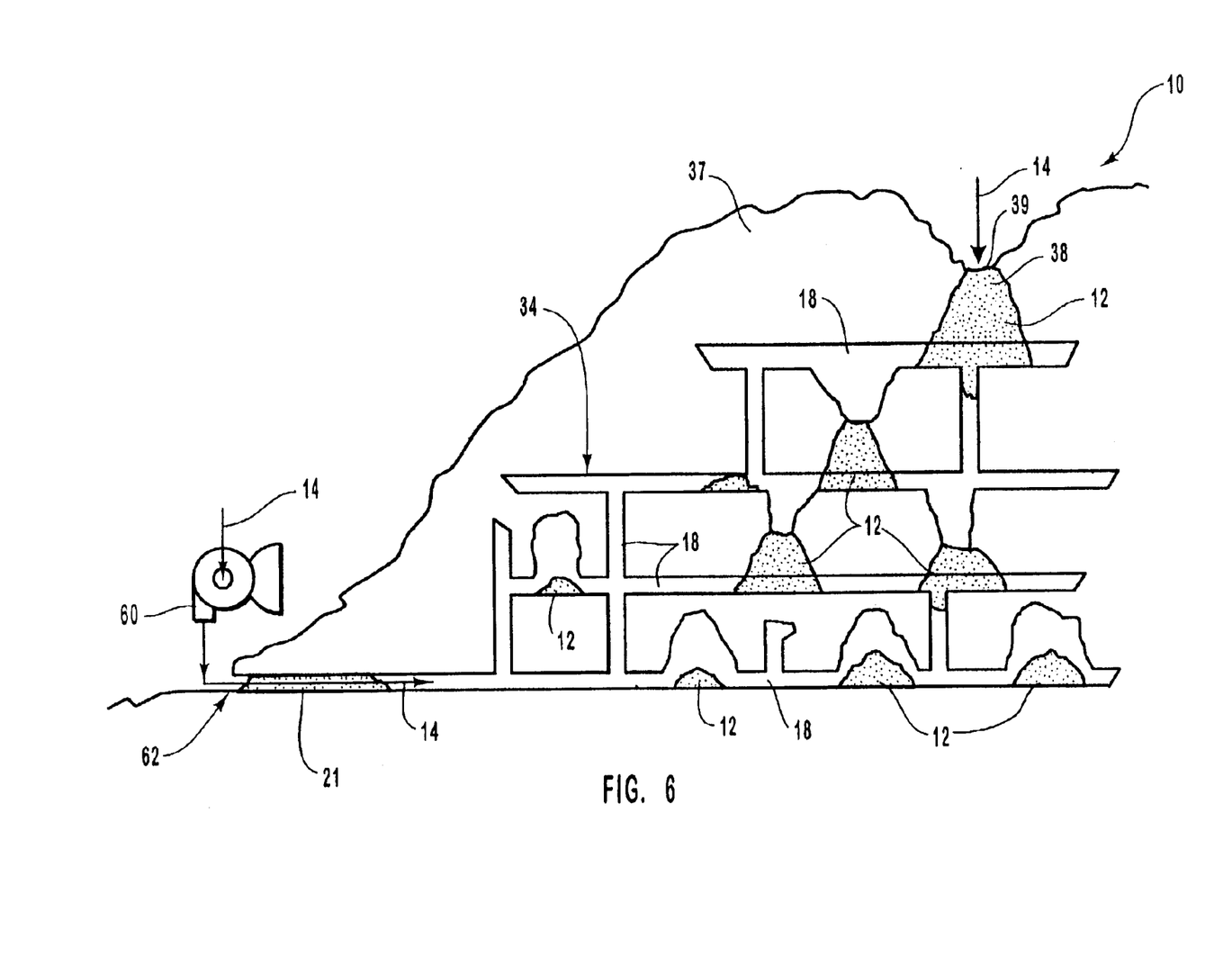
FIG. 6 is a side plan cutaway view of a bioremediation emulsion applied below the surface of a mine contaminated with earth media.

FIG. 6 illustrates bioremediation of an inactive or abandoned underground mine 37 to immobilize metals that would otherwise cause acid rock drainage from the mine. Organic/water emulsion 14 is introduced into the caved earth material above the mine, either by direct application and infiltration from the surface 39, if subsidence 38 has proceeded to the surface, or by injection from wells (See FIG. 4). Organic/water emulsion 14 will flow by gravity through mine tunnels 39 and other internal passages 18, and infiltrate the broken rock comprising the media 12. Therein, local anaerobic conditions will result by process 10. Thus, oxidation of metal sulfide minerals mobilizing the metals and causing acid rock drainage is prevented. Organic material/water emulsion 14 can also be injected by a pump 60 into the mine through open tunnels and adits 62.

The following experimental examples provide a better understanding of the invention and the ability of organic/water emulsions 14 to infiltrate deep into a vertical column of fine sand representing a large tailings impoundment, waste rock heap or other media, while retaining the organic phase, even after repeated subsequent water rinsing. Rinsing is an accelerated equivalent of meteoric water infiltration occurring over a long time after the emulsion 14 is introduced.

All of these experiments were performed using 30 mesh washed quartz sand with a nominal particle size of 0.5 mm in columns that were flooded and drained with water prior to each experiment. Prior to emulsion addition, the hydraulic conductivity of the media was measured, using water percolating through the column, and found to be 0.46 mm/sec.

This hydraulic conductivity is somewhat higher than for typical mining mill tailings which are usually ground to −65 mesh or finer, but it is fairly representative of mine waste and ore heaps where the smaller rocks in a wide distribution of rock sizes control the hydraulic conductivity. Because of ready availability, straight asphalt emulsions 14 were used.

EXAMPLE 1

A 20% asphalt emulsion was prepared and used to evaluate its infiltration into 30 mesh washed sand, contained in a vertical column, 3 inch inside diameter×15 feet high. Because of the anionic emulsifying reagent selected, this emulsion was relatively stable. 1500 ml of emulsion were added to the wet, drained sand column at an average superficial velocity of 0.0029 mm/sec, which corresponds to an application rate typical of an impact sprinkler or drip irrigation system. 1350 ml of clear water were recovered, indicating that the emulsion infiltrated in nearly plug flow, pushing out some of the retained water. Additional emulsion was gradually added and resulted in an additional clear water drainage of 1700 cc. The total estimated carbon addition was 1.5 wt pct of the contained weight of sand (32 kg).

After these emulsion additions, the column was rested 21 days to allow the emulsion to disengage, prior to a water leaching test. Then, 100 cm (forty inches) of water (4.5 liters) were passed through the column. This is an amount equal to the total meteoric water precipitation over a period of two or more years at most Western USA mine sites.

Laboratory analysis of the drain water showed that it contained only 0.03% asphalt and 0.01+ % mineral matter. The cumulative asphalt loss was computed to be less than 0.5%. In other words, 99.5+ % of the asphalt was retained in the first 15 feet of a simulated media heap.

EXAMPLE 2

A similar test with a more dilute cationic emulsifier (10% asphalt) showed that sealing quickly occurred. After the standing emulsion was removed, excavation of the upper sand layers showed that emulsion penetration into the sand was less than 15 cm. Hence, cationic emulsifiers, even slow setting ones, do not appear to be good candidates for deep infiltration of organic/water emulsions into permeable media.

EXAMPLE 3

An experiment was performed using a sand column pre-primed with an aqueous solution containing 1% Mg++ as an in situ emulsion breaker. After draining the MgSO4 solution, 2,250 cc of the 20% anionic emulsion were poured into the column, initially very rapidly. However, toward the end of this emulsion insertion the hydraulic conductivity was severely reduced, indicating that the magnesium ions retained in the column were likely accelerating emulsion breakdown, as expected.

EXAMPLE 4

An experiment was conducted using a series of six columns (1.5 inch inside diameter) with 30 mesh wet, drained sand to determine the sand penetration resulting from diluting a stable emulsion with additional water. Each column had an effective sand height of 13 feet. For this experiment 700 ml of a 2% asphalt emulsion were introduced over 24 hours into the first column. If applied to the surface of a media heap at once, this amount represents a basin depth of 0.6 m (24 inches). After introducing the emulsion, water was added to the first column at approximately 8 hour time increments over the next four weeks. Discharge from the first column went to the second column and so forth through the columns. At all times the discharge from the fourth column was clear, indicating that at the 2% dilution, essentially all of the asphalt had disengaged and been retained in the first 50 feet of a simulated ore heap. Most of the asphalt was in the first column, with the disengagement and deposition of asphalt apparently being proportional to the amount of asphalt remaining in the emulsion at any location and time.

EXAMPLE 5

An experiment was conducted identical with example 4 except that the water used for diluting the emulsion contained 0.1% of additional dissolved emulsifying reagent. The asphalt deposition result was no different from that of example 4, but the additional emulsifier washed out with the rinsing water. Hence, all of the emulsifier must be introduced before entering the colloid mill.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced with their scope.

What is claimed and desired to be secured by United States Letters Patent is:

1. An in situ bioremediation process comprising the steps of:
   creating a liquid emulsion comprising an aqueous phase and a dispersed organic material phase;
   applying said emulsion to a permeable media containing a contaminant, to establish anaerobic conditions in the media; and
   allowing the organic material to disengage from the emulsion and attach to internal media surfaces, thereby leaving the organic material retained within the media.
2. The process of claim 1, further comprising, providing at least one bacterial microbe in sufficient proximity to the organic material to facilitate a reaction between the organic material and the media contaminant.
3. The process of claim 2, wherein the step of providing at least on microbe includes relying on natural microbes that exist in the media.
4. The process of claim 2, wherein at least one microbe is included in the emulsion.
5. The process of claim 1, wherein the organic material is capable of donating an electron in a chemical reaction.
6. The process of claim 1, wherein the organic material promotes adhesion of the emulsion to the media.
7. The process of claim 1, wherein the organic material is derived from minerals.
8. The process of claim 1, wherein the organic material is derived from vegetables.
9. The process of claim 1, wherein the organic material comprises refined petroleum.
10. The process of claim 9, wherein the step of applying the emulsion into the media comprises spreading the emulsion onto the surface of the media for infiltration into the media by gravity.

11. The process of claim 9, wherein the emulsion comprises a biological nutrient for sustaining bacteria in the media.

12. The process of claim 11, wherein the biological nutrient is phosphate.

13. The process of claim 12, wherein the step of applying the emulsion into the media comprises spreading the emulsion onto the surface of the media for infiltration into the media by gravity.

14. The process of claim 9, wherein the organic material comprises a mixture of asphalt and an asphalt dissolving solvent.

15. The process of claim 14, wherein the solvent comprises at least one of the following group: naptha, kerosene, diesel fuel, fuel oil, oil gas, and petroleum distillates.

16. The process of claim 14, wherein the asphalt content of the organic material is less than about fifty percent.

17. The process of claim 14, wherein the solvent content of the organic material is greater than about twenty percent.

18. The process of claim 1, wherein the emulsion is applied to the media after it is submerged within an anaerobic basin to intercept and treat contaminated surface water flowing into and through the media.

19. The process of claim 18, wherein the contaminated surface water is acid rock drainage.

20. The process of claim 1, wherein the organic material is present in the emulsion in an amount greater than about one-tenth of one percent of the emulsion.

21. The process of claim 1, wherein the organic material is present in the emulsion in an amount less than about eighty percent of the emulsion.

22. The process of claim 1, wherein the emulsion comprises a biological nutrient for sustaining bacteria in the media.

23. The process of claim 22, wherein the biological nutrient is phosphate.

24. The process of claim 23, wherein the step of applying the emulsion into the media comprises spreading the emulsion onto the surface of the media for infiltration into the media by gravity.

25. The process of claim 22, wherein the biological nutrient is nitrogen.

26. The process of claim 22, wherein the biological nutrient is a water soluble organic material.

27. The process of claim 26, wherein the biological nutrient is a carbohydrate.

28. The process of claim 2, wherein the microbe facilitates the reduction of sulfate contaminant in the media to a sulfide under anaerobic conditions.

29. The process of claim 28, wherein the microbe is selected from one of the following genera group: Desulfovibrio, Desulfomonas and Desulfomaculum.

30. The process of claim 2, wherein the microbe facilitates the precipitation of at least one metal contaminant within the media as a metal sulfide, the metal contaminant being selected from: As, Sb, Cd, Hg, Cu, Ni, Zn, Go, Mn, Ag, or Fe.

31. The process of claim 2, wherein the microbe facilitates the alteration of the chemical composition of a water soluble inorganic contaminant in the media to a less environmentally harmful composition.

32. The process of claim 31, wherein the inorganic contaminant includes at least one selected from: $CN^-$, $NO_3^-$, $NO_2^-$, $SeO_4^{2-}$, $Cr^{6+}$, or $UO_2^{2+}$.

33. The process of claim 2, wherein the microbe facilitates the alteration of the chemical composition of a least one chlorinated hydrocarbon contaminant in the media to a less environmentally harmful composition.

34. The process of claim 1, wherein the step of applying the emulsion into the media comprises spreading the emulsion onto the surface of the media for infiltration into the media by gravity.

35. The process of claim 1, wherein the step of applying the emulsion into the media comprises flowing the emulsion through a passage into the media by gravity.

36. The process of claim 1, wherein the step of applying the emulsion into the media comprises pumping the emulsion through a passage into the media.

37. The process of claim 1, wherein the emulsion is applied to the media to form a sub-surface reactive barrier to intercept and treat contaminated groundwater flowing into and through the emulsion infiltrated media.

38. The process of claim 1, wherein the emulsion is applied to the media before it is submerged within an anaerobic basin to intercept and treat contaminated surface water flowing into and through the media.

39. The process of claim 38, wherein the contaminated surface water is acid rock drainage.

40. The process of claim 1, wherein the media is selected from one of the following group: soil, earth, surface mining waste rock, underground mining waste rock, mill tailings, chemically leached ore heaps, industrial waste piles, sludge ponds and landfills.

41. The process of claim 1, wherein the emulsion includes an emulsifying reagent selected from one of the following: anionic surfactant, cationic surfactant, and nonionic surfactant.

42. The process of claim 41 wherein the emulsifying reagent selected is greater than about two percent of the volume of the emulsion.

43. The process of claim 41 wherein the emulsifying reagent selected is less than about five percent of the volume of the emulsion.

44. The process of claim 1, wherein the aqueous phase comprises water soluble electron donor material.

45. The process of claim 44, wherein the aqueous phase comprises a carbohydrate.

46. An in situ bioremediation process comprising the steps of:
   creating an emulsion of an oil dispersed in water;
   applying said emulsion into a permeable media having a metal sulfate contaminant;
   disengaging the emulsion within the media thereby leaving the oil dispersed as droplets within and attached to the media;
   providing at least one bacterial microbe in sufficient proximity to the dispersed oil within the media to facilitate a biochemical reaction between the oil and the sulfate contaminant reducing the metal sulfate contaminant to metal sulfide; and
   providing a biological nutrient to the media to sustain the bacterial microbes in the media.

47. An in situ bioremediation process comprising the steps of:
   creating an emulsion of an insoluble, electron-donor material dispersed in water;
   applying the emulsion into a permeable media containing a contaminant to establish anaerobic conditions within the media;
   allowing the insoluble, electron-donor material to break from the emulsion, thereby leaving the insoluble electron-donor material attached to the media internally;
   providing at least one bacterial microbe in sufficient proximity to the insoluble electron-donor material to promote a chemical or biochemical reaction between the insoluble electron-donor material and a media contaminant; and providing a biological nutrient for sustaining bacteria in the media.

48. The process of claim 47, wherein the electron-donor material is derived from minerals.

49. The process of claim 48, wherein the electron-donor material comprises refined petroleum.

50. The process of claim 49, wherein the biological nutrient is phosphate.

51. The process of claim 50, wherein the step of applying the emulsion into the media comprises spreading the emulsion onto the surface of the media for infiltration into the media by gravity.

52. The process of claim 49, wherein the step of applying the emulsion into the media comprises spreading the emulsion onto the surface of the media for infiltration into the media by gravity.

53. The process of claim 49, wherein refined petroleum comprises a mixture of asphalt and an asphalt dissolving solvent.

54. The process of claim 53, wherein the solvent content of the organic material is greater than about twenty percent.

55. The process of claim 53, wherein the emulsion includes an emulsifying reagent selected from one of the following: anionic surfactant, cationic surfactant, and nonionic surfactant.

56. An in situ bioremediation process comprising the steps of:

creating an emulsion of refined petroleum dispersed in water, the emulsion comprising an emulsifying reagent;

applying the emulsion into a permeable media containing a contaminant to establish anaerobic conditions within the media;

allowing the refined petroleum to break from the emulsion, thereby leaving the refined petroleum attached to the media internally;

providing at least on bacterial microbe in sufficient proximity to the refined petroleum to facilitate the reduction of a sulfate contaminant in the media to a sulfide under anaerobic conditions; and providing a biological nutrient for sustaining bacteria in the media.

57. The process of claim 56, wherein the emulsifying reagent is selected from one of the following: anionic surfactant, cationic surfactant, and nonionic surfactant.

58. The process of claim 56, wherein the step of applying the emulsion into the media comprises spreading the emulsion onto the surface of the media for infiltration into the media.

59. The process of claim 58, wherein the biological nutrient is phosphate.

* * * * *